United States Patent
Besenbruch et al.

(10) Patent No.: US 10,373,300 B1
(45) Date of Patent: Aug. 6, 2019

(54) SYSTEM AND METHOD FOR LOSSY IMAGE AND VIDEO COMPRESSION AND TRANSMISSION UTILIZING NEURAL NETWORKS

(71) Applicant: Deep Render Ltd., London (GB)

(72) Inventors: Christian Lars Besenbruch, London (GB); Arsalan Ali Zafar, London (GB)

(73) Assignee: Deep Render Ltd., London (GB)

( * ) Notice: Subject to any disclaimer, the term of this patent is extended or adjusted under 35 U.S.C. 154(b) by 0 days.

(21) Appl. No.: 16/397,725

(22) Filed: Apr. 29, 2019

(51) Int. Cl.
| | |
|---|---|
| G06K 9/36 | (2006.01) |
| G06T 5/50 | (2006.01) |
| H04N 7/035 | (2006.01) |
| G06T 7/00 | (2017.01) |
| G06T 5/00 | (2006.01) |
| G06N 3/04 | (2006.01) |
| G06N 3/08 | (2006.01) |
| H04N 7/12 | (2006.01) |
| G06T 9/00 | (2006.01) |

(52) U.S. Cl.
CPC ............. G06T 5/50 (2013.01); G06N 3/0454 (2013.01); G06N 3/08 (2013.01); G06T 5/002 (2013.01); G06T 7/0002 (2013.01); G06T 7/97 (2017.01); G06T 9/002 (2013.01); H04N 7/035 (2013.01); H04N 7/12 (2013.01); G06T 2207/10016 (2013.01); G06T 2207/20084 (2013.01); G06T 2207/30168 (2013.01)

(58) Field of Classification Search
None
See application file for complete search history.

(56) References Cited

U.S. PATENT DOCUMENTS

| | | | | |
|---|---|---|---|---|
| 7,647,618 | B1* | 1/2010 | Hunter | G06Q 20/123 709/229 |
| 2004/0045030 | A1* | 3/2004 | Reynolds | H04L 29/06 725/110 |
| 2005/0089215 | A1* | 4/2005 | Staelin | H04N 19/86 382/157 |
| 2006/0053086 | A1* | 3/2006 | Fazzini | H04N 19/172 706/15 |

(Continued)

FOREIGN PATENT DOCUMENTS

| | | |
|---|---|---|
| WO | 2017136083 A1 | 8/2017 |
| WO | 2018218249 A1 | 11/2018 |

*Primary Examiner* — Shervin K Nakhjavan
(74) *Attorney, Agent, or Firm* — Brian R. Galvin; Galvin Patent Law LLC

(57) ABSTRACT

A system and method for lossy image and video compression and transmission that utilizes a neural network as a function to map a known noise image to a desired or target image, allowing the transfer only of hyperparameters of the function instead of a compressed version of the image itself. This allows the recreation of a high-quality approximation of the desired image by any system receiving the hyperparameters, provided that the receiving system possesses the same noise image and a similar neural network. The amount of data required to transfer an image of a given quality is dramatically reduced versus existing image compression technology. Being that video is simply a series of images, the application of this image compression system and method allows the transfer of video content at rates greater than existing technologies in relation to the same image quality.

6 Claims, 17 Drawing Sheets

(56) References Cited

U.S. PATENT DOCUMENTS

| | | | |
|---|---|---|---|
| 2006/0212892 A1* | 9/2006 | Hunter | H04N 5/913 725/1 |
| 2014/0072242 A1* | 3/2014 | Wei | H04N 19/176 382/299 |
| 2019/0087726 A1* | 3/2019 | Greenblatt | G06N 3/08 |
| 2019/0139193 A1* | 5/2019 | Navarrete Michelini | G06T 3/4069 |

* cited by examiner

SYSTEM AND METHOD FOR LOSSY IMAGE AND VIDEO COMPRESSION AND TRANSMISSION UTILIZING NEURAL NETWORKS

CROSS-REFERENCE TO RELATED APPLICATIONS

None.

BACKGROUND OF THE INVENTION

Field of the Art

The disclosure relates to the field of data compression, more specifically to the field of lossy image compression and transmission utilizing neural networks.

Discussion of the State of the Art

Since the start of widespread use of the internet a bit more than two decades ago, there has been an exponential growth in the amount of data being transmitted worldwide. In the past decade, even as the amount of data transmitted continues to grow exponentially, video content has accounted for an ever-increasing portion of those data. According to at least one study, video content accounted for 64% of the world's internet traffic in 2014, and is on track to account for up to 85% of the world's internet traffic in 2019.

Given that the amount of data being transmitted continues to grow exponentially, and that most of the world's internet traffic is now video content, video compression technology has become critically important. However, existing video compression technology has not kept pace with the change. The current leading video compression technologies, High Efficiency Video Coding (HVEC, also known as H.265) and its open-source competitor, AV1 are incremental improvements of video compression technologies developed in the early part of this century (i.e., H.264/MPEG-4 AVC and Google's open-source VP coding format). Although the newer video compression standards have improved throughput at the same level of quality versus their older counterparts, that method of video compression may already have hit a point of diminishing returns, and is unlikely to yield significant further improvements.

What is needed is a system and method for image and video compression whose performance dramatically exceeds the performance of current state of the art image and video compression.

SUMMARY OF THE INVENTION

Accordingly, the inventor has conceived and reduced to practice, a system and methods for lossy image and video compression that utilizes a neural network as a function to map a known noise image to a desired image, allowing the transfer only of hyperparameters of the function instead of a compressed version of the image itself. This allows the recreation of a high-quality approximation of the desired image by any system receiving the hyperparameters, provided that the receiving system possesses the same noise image and the same or a similar neural network. The amount of data required to transfer an image of a given quality is dramatically reduced versus existing image compression technology. Being that video is simply a series of images, the application of this image compression system and method allows the transfer of image content at rates greater than existing technologies in relation to the same image quality, and is expected to soon be able to exceed the state-of-the-art in video compression as well. The following non-limiting summary of the invention is provided for clarity, and should be construed consistently with embodiments described in the detailed description below.

According to a preferred embodiment, a system for lossy image and video compression and transmission utilizing neural networks is disclosed, comprising: an image compression engine comprising a first processor, a first memory, and a first plurality of programming instructions stored in the first memory, wherein the first plurality of programming instructions, when operating on the first processor, cause the first processor to: receive a desired image, retrieve a noise image; map the known noise image to the desired image using a first neural network to find hyperparameters such that the hyperparameters, when applied to the noise image using the first neural network, produce an approximation of the desired image within an error that is less than a pre-determined threshold; and transmit the hyperparameters; and an image decompression engine comprising a second processor, a second memory, and a second plurality of programming instructions stored in the memory, wherein the second plurality of programming instructions, when operating on the second processor, cause the second processor to: receive the hyperparameters; retrieve the noise image; and apply the hyperparameters to the noise image using a second neural network to produce an approximation of the desired image within an error that is less than the pre-determined threshold.

According to another preferred embodiment, a method for lossy image compression and transmission utilizing neural networks is disclosed, comprising the steps of: receiving a desired image at a first computing device; retrieving a noise image using the first computing device; mapping, using the first computing device, the noise image to the desired image using a first neural network to find hyperparameters such that the hyperparameters, when applied to the noise image using the first neural network, produce an approximation of the desired image within an error that is less than a pre-determined threshold; and transmitting the hyperparameters to a second computing device; and receive the hyperparameters at a second computing device; retrieving the noise image at the second computing device; and applying, using the second computing device, the hyperparameters to the noise image using a second neural network to produce an approximation of the desired image within an error that is less than the pre-determined threshold.

According to an aspect of an embodiment, the image compression engine further comprises a dedicated 2D convolutional processor to accelerate the operation of the first neural network.

According to an aspect of an embodiment, the image decompression engine further comprises a dedicated 2D convolutional processor to accelerate the operation of the second neural network

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
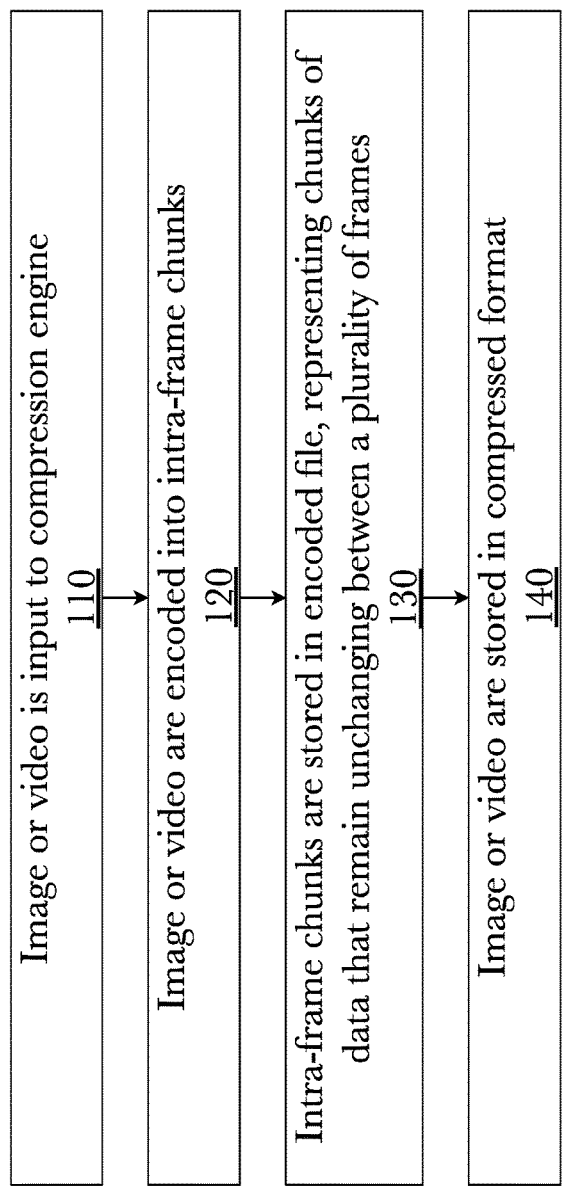
FIG. 1 (PRIOR ART) is a method diagram summarizing the HVEC video compression and the similar BPG image compression methodology.

The inventor has conceived, and reduced to practice, a system and methods for lossy image and video compression that utilizes a neural network as a function to map a desired image to a known noise image, allowing the transfer only of hyperparameters of the function instead of a compressed version of the image itself. This allows the recreation of a high-quality approximation of the desired image by any system receiving the hyperparameters, provided that the receiving system possesses the same noise image and a similar neural network. The amount of data required to transfer an image of a given quality is dramatically reduced versus existing image compression technology. Being that video is simply a series of images, the application of this image compression system and method will work equally well for video as for single images, and may in time allow the transfer of video content at rates greater than existing technologies in relation to the same image quality. One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Function," "image transformation function," "image transformation network," and "image transformation neural network" as used herein mean the use of a neural network as a function to transform an image or to re-create an approximation of an image. The transformation is based on mapping of an input noise image to a target image, and adjustment of the weights of differing variables within the function, which may also be referred to as hyperparameters. Hyperparameters may also be used an inputs to the function, along with the noise image, to re-create an approximation of the image.

"Hyperparameter" as used herein means the parameters of a function that maps a noise image to a desired image within a specified margin of error. When an image is input into the function f or mapping at a source location, hyperparameters will be the output. The hyperparameters may then be transferred to a destination location, wherein the hyperparameters will be the input to the same (or similar) function with the same noise image, and the output of the function will be an approximation of the desired image at the destination location. Note that the term "hyperparameters" as used in functional encoding terminology (as used here) is equivalent to the terms "weights" or "weight-parameters" as used in machine learning terminology.

"Image" or "desired image" as used herein means a digital representation of an image. This digital representation may be in any image file format, of which there already exist a great number. Image files are commonly classified as either raster-based formats (i.e., formats in which the content of pixels or areas of the image are specified) or vector-based (i.e., formats in which shapes and their relationships are specified without regard to specific pixels, areas, or image sizes). For exemplary purposes, a non-exhaustive and non-limiting list of raster-based formats includes Microsoft Windows bitmap (bmp), CompuServe Graphics Interchange Format (gif), Joint Photographic Experts Group JFIF format (jpg or jpeg), Portable Graphics Network (png), and Tagged Image File Format (tif or tiff). For exemplary purposes, a non-exhaustive and non-limiting list of vector-based formats includes Adobe Illustrator File (ai), CorelDRAW Image File (cdr), Scalable Vector Graphics File (svg), and Microsoft Visio Drawing File (vsd).

"Image transformation" as used herein means the act of transforming any image, or even a blank or "empty" image file, into any other image. This may be done with numerous different techniques, in any combination, including specific pixel alterations, the use of vector graphics based on mathematical equations (for example, graphing curves with equations which yield perfect resolution no matter the zoom on the image itself, since it is specified with an equation rather than represented by specific pixels at a given resolution), or examining and altering groups of pixels such as for border detection and alteration. Altering the positions of pixels of data in an image, but keeping the data otherwise unchanged, for example rotating an image, is another example of an image transformation.

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information. An example of a machine learning algorithm is AlphaGo, the first computer program to defeat a human world champion in the game of Go. AlphaGo was not explicitly programmed to play Go. It was fed millions of games of Go, and developed its own model of the game and strategies of play.

"Neural network" as used herein means a computational model, architecture, or system made up of a number of simple, highly interconnected processing elements which process information by their dynamic state response to external inputs, and is thus able to "learn" information by recognizing patterns or trends. Neural networks, also sometimes known as "artificial neural networks" are based on our understanding of the structure and functions of biological neural networks, such as the brains of mammals. A neural network is a framework for application of machine learning algorithms.

"Static noise image" or "noise image" as used herein means an image with random or pseudo-random content. In some embodiments, the random or pseudo-random content will be at the pixel level, or be at the level of groups, areas, or regions of pixels. In some embodiments, the random or pseudo-random content may comprise a single bit per pixel, representing either black or white for that pixel. In some embodiments, the randomness property of the image may be the 2D maximum information entropy, or Shannon Entropy, as part of its properties. Shannon Entropy refers to the amount of randomness or possible information a given statistical model can have, expressed in bits. For example, a coin flip has an information entropy or Shannon Entropy of 1, while m coin flips have an entropy value of m, because a single coin flip has a value or 0 (tails) or 1 (heads), represented by 1 bit. The higher the entropy value for a given object, the more possible states it may be in, which makes it harder to predict the state of, but more malleable for transforming into many possible states and acquire an estimation of another state, for example, transforming into an approximation of another image. In some embodiments, the random or pseudo-random content may further comprise grayscale or color information. In some embodiments, the random or pseudo-random content may comprise vector graphics or other forms of image representation instead of bitmaps or pixels.

"Video" as used herein means a digital representation of a sequence of images representing movement. This digital representation may be in any video file format, of which there already exist a great number. Video files typically contain coded video (visual) data and audio (audible) data in a "container." This application is primarily concerned with the video data portion of a video file. For exemplary purposes, a non-exhaustive and non-limiting list of video formats includes Audio Video Interleave (avi), Motion Pictures Expert Group (mpg, mpeg, mpg, mp4, etc.), Apple video format (m4v), and Windows Media Video (wmv).

Conceptual Architecture

FIG. 1 (PRIOR ART) is a method diagram summarizing the HEVC video compression and the similar BPG image compression methodology. First, an image or video file is input into a compression codec or compression engine 110, before data files are encoded with intra-frame chunks 120 which remain unchanging through frames of a video in the case of HEVC video file compression, meaning that between frames of a video where a grouping of pixels do not change or change very little, that grouping is not re-encoded in multiple frames of the video 130, thereby reducing the size of the video with only a minor loss of movement in frames. In the case of BPG formatting for still images rather than video for HEVC video formatting, clusters of similar data including color depth are maintained for groups of pixels in a still image 130, representing a decrease in the data required for equivalently sized images, resulting in a compressed format using similar techniques for both video and still images 140.

Figure 2:
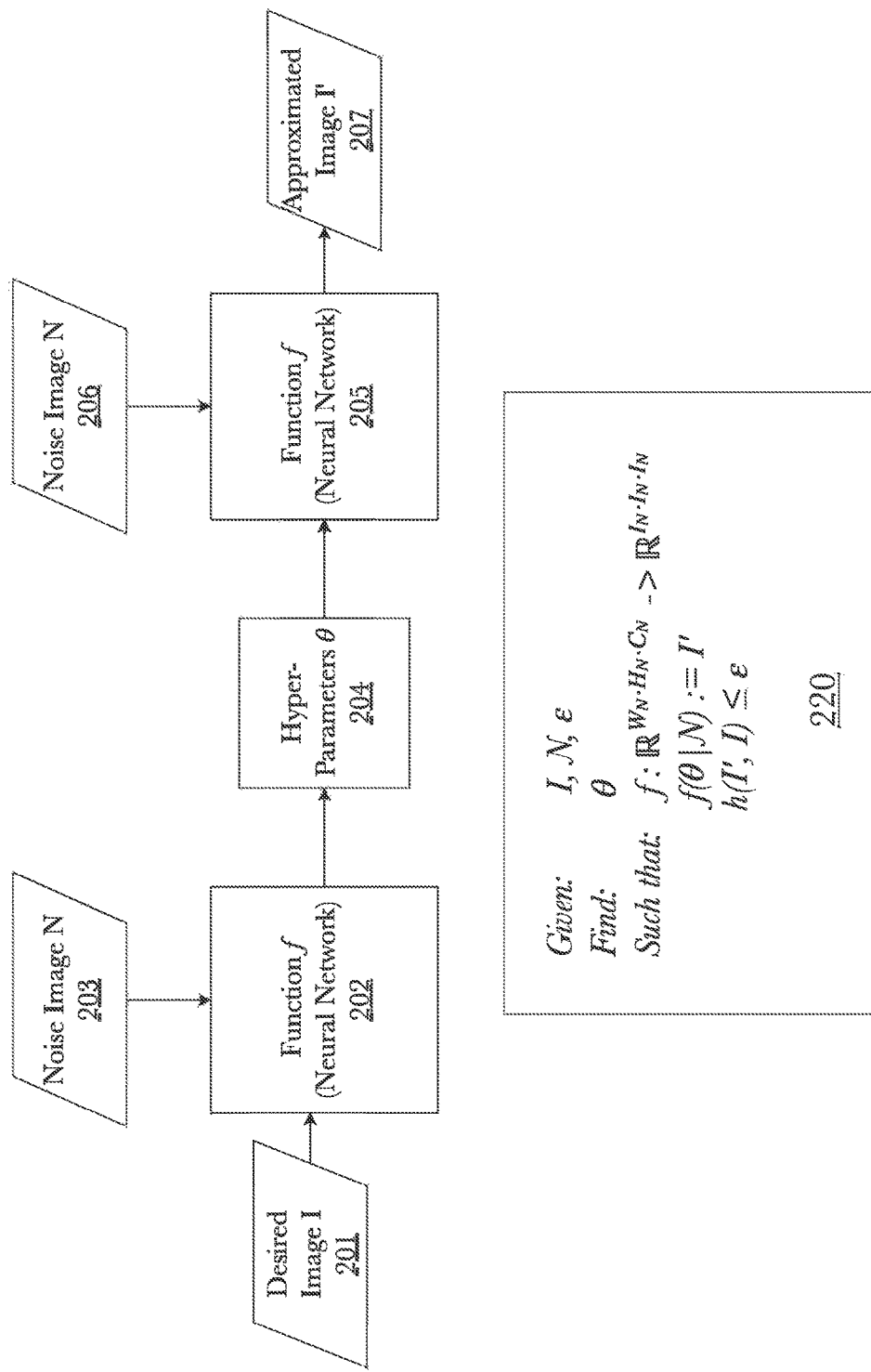
FIG. 2 is a diagram illustrating an exemplary algorithm for implementation of an aspect of a preferred embodiment.

FIG. 2 is a diagram illustrating an exemplary algorithm for implementation of an aspect of a preferred embodiment. In this algorithm, a desired image 201 and a noise image 203 are input into a function $f$ 202. Function $f$ 202 is a neural network configured to map noise image 203 to a desired image 201. The output of function $f$ 202 is a set of hyperparameters P 204, or "weights" of function $f$ 202, that map the noise image 202 to the desired or target image 201 within a specified margin of error. The mathematical formula for this algorithm is:

Given: I, N, ε, find θ, such that:

$$f: R^{W_N * H_N * C_N} \to R^{I_N * I_N * I_N}, \text{ where } f(\theta|N) := I' \text{ and } h(I',I) \leq \varepsilon$$

The algorithm may be generally described as follows. Given a color image I (which corresponds to target or desired image 201), with width $W_I$, height $H_I$ and depth $C_I$, there is an algorithm 220 which may find a mapping between a given max-entropy image N of size $W_N \times H_N \times C_N$ and I, by fine-tuning the hyperparameters θ of a known function $f$ 202. However, such an algorithm is only capable of reconstructing an approximation of the original image, allowing an error up to a defined threshold, ε. The algorithm 220 measures the error between two images through a function h which may be one of several possible image comparison functions, such as a pixel-wise mean-square-error function.

If for all images I there exists an $f$ 202 with $\theta_f$ such that the above statement holds true, then it is possible to approximately represent all images via a triplet of $\{f; \theta_f, N\}$. If function $f$ 202 is fixed, and its input N, the only thing missing to create I' is θ. If the file size of θ is smaller than the file size of I, the algorithm has successfully lossy-compressed I, because one only need send θ with a bitstream of size filesize (θ) to create I' from the triplet $\{f; \theta, N\}$ at a destination device, by inputting noise image 206 and parameters θ 204 into $f$ 205 on the destination/receiving side to obtain approximated target image I' 207.

However, it is not immediately obvious how to choose a function (that will efficiently find θ. The solution is to use a neural network with its typical structure of convolution→bias→non-linearity→repeat as function $f$. By using a neural network as function $f$, the solution to finding its hyperparameters θ given I becomes a machine learning training problem that can be solved using, for example, stochastic gradient descent (SGD). In short, SGD is used to learn the hyperparameters (aka weights) which minimize the error function h, thus obtaining θ for I.

After hyperparameters θ 204 are output from a neural network 202, they may be input into a separate instance of the same or a similar neural network 205, along with a separate instance of an identical noise image 206, to produce an approximation of a desired image I 207. In this way, the system operates as compressor and decompressor, by generating one of two objects depending on what is received as input, either hyperparameters θ 204 or an approximation of an image I 207. The instances of these objects, such as the decompression neural network 205 and associated data, may be operating on different computers, for example a first network endpoint possessing a desired image I 201, function $f$ 202, and noise image 203, may operate on one computer such as a smartphone, laptop, or other computing device, while another function $f$ 205, noise image 206, may exist on another computing device, possibly but not necessarily over a network. It is possible, for instance, for files to be transferred via a portable memory device, rather than over a network between two computers. It is important to note that the different instances of the neural network at either end of a transmission need not be identical. Neural networks that function similarly will produce an acceptable solution, even if their architecture, programming, or other characteristics are different.

Figure 3:
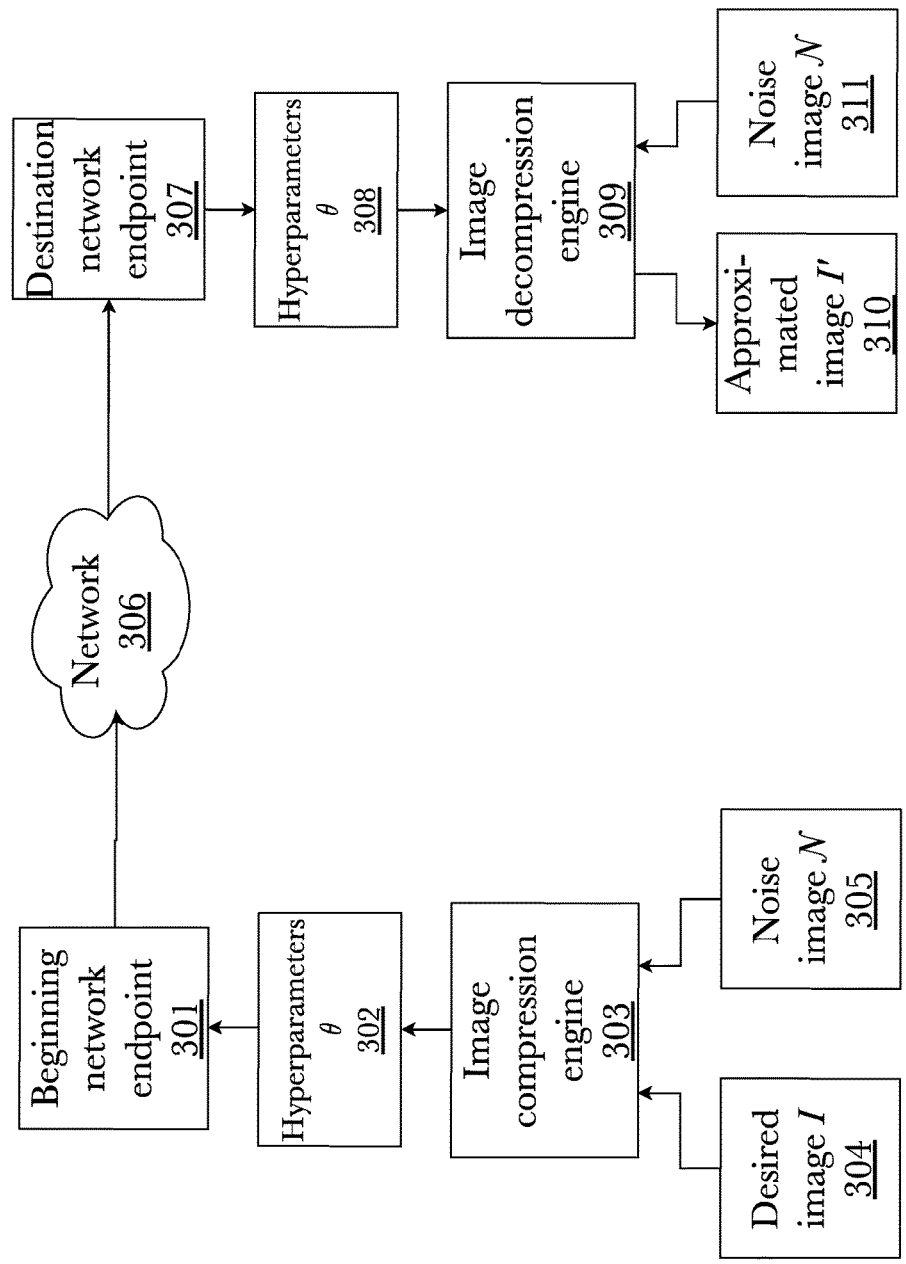
FIG. 3 is an exemplary overall system diagram, according to a preferred embodiment.

FIG. 3 is an exemplary overall system diagram, according to a preferred embodiment. A network endpoint 301, which may be a laptop or desktop computer, a mobile phone, a workstation, or some other manner of network-enabled computing device, may be connected over a network 306 such as the Internet, and possess a desired image I 304 and noise image N 305. On a network endpoint 301, both images may be used as inputs for an image compression engine 303, which is directly accessible by a network endpoint 301. A desired image I 304 may be in one of many image formats, including JPG/JPEG, .PNG, .BMP, or other formats, the specific format of it being a non-crucial element to the instant invention, as new formats may be identified and accounted for in the future as applicable. A static noise image N 305 may similarly be in one of many formats, and may be a singular, unchanging image, which is used in all implementations of the system, or it may be one of several possible images, and sent to the system as input from another source, whether a network endpoint 307 or some other source containing the image. In some embodiments, the static noise image N 305 represents an image that has the highest 2D Shannon Entropy, which may be used for transformation into other images as needed. An image compression engine 303 is an engine present on a network endpoint 301, which may take, as input, a desired image I 304 and static noise image N 305, and execute an image transformation function 202 to generate hyperparameters for the function 202 which, when applied to the noise image N 350, allow the recreation of a close approximation I' (read as "I-prime" and denoting an approximation of I) 310 of a desired image I 304. Specifically, a destination endpoint 307 may receive hyperparameters 308 for input into another instance of an image decompression engine 309, also using a static noise image 311 as input, allowing it to produce an approximation 310, I', of a desired image I 304.

Figure 4:
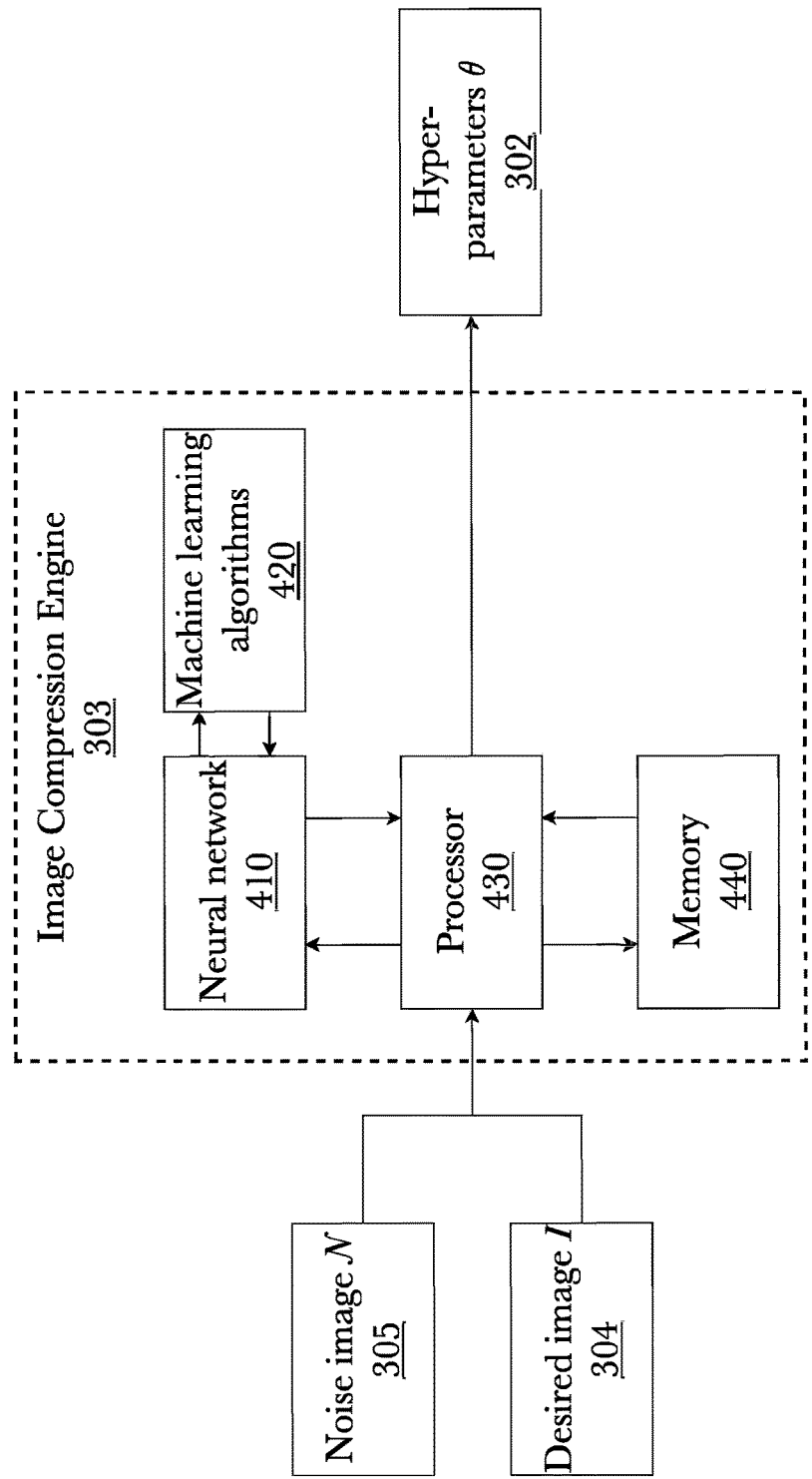
FIG. 4 is a exemplary system diagram of an image compression engine, according to an aspect.

FIG. 4 is an exemplary system diagram of an image compression engine 303, according to a preferred embodiment. As shown in FIG. 3, a noise image N 305, and goal image I 304, which respectively represent a maximum entropy noise image and the initial image to be compressed, are input into a processor 430. A processor 430 is a common computing device used to process arithmetic and logical operations, and is commonly known in the art. A processor 430 has two-way communication with at least a single bit of volatile memory 440, commonly known as Random Access Memory ("RAM"), for short-term storage of data to be accessed by a processor 430, the processor altering data in the RAM and using data in the RAM to alter its own processes. This is commonly understood as one of the key interactions in modern computing. A processor 430 also communicates with a neural network 410, which operates as a function $f$ in an algorithm 220, operating as a framework for machine learning algorithms 420 to process incoming data from a noise image 305 and goal image 304. After an input image 304 is re-created approximately, using the algorithm 220 in FIG. 2, the hyperparameters 302 of a neural network 410 are output to the network endpoint 301 for further use, including transmitting to a destination endpoint, saving on a hard-drive or external memory device, or other common uses for compressed images.

Figure 5:
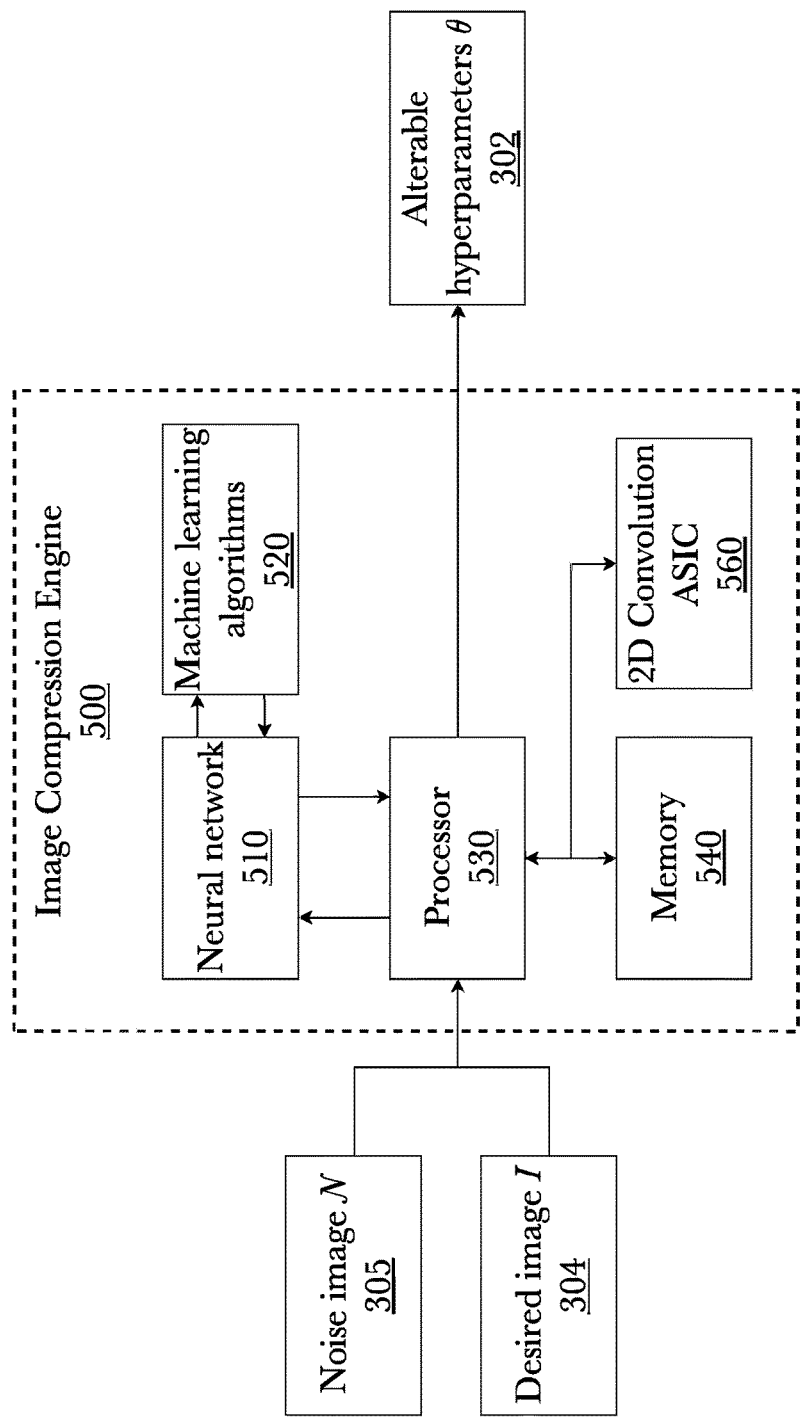
FIG. 5 is a system diagram of another exemplary embodiment of an image compression engine, utilizing a 2D convolution Application Specific Integrated Circuit ("ASIC), according to an embodiment

FIG. 5 is a system diagram of another exemplary embodiment of an image compression engine 500, utilizing a 2D convolution Application Specific Integrated Circuit ("ASIC") 560, according to an embodiment. In this embodiment, a 2D convolution ASIC 560 is utilized to reduce the amount of processing time required for the system to fully compress an image. As shown in FIG. 3, a noise image N 305, and goal image I 304, which respectively represent a maximum entropy noise image and the initial image to be compressed, are input into a processor 530. A processor 530 is a common computing device used to process arithmetic and logical operations, and is commonly known in the art. A processor 530 has two-way communication with at least a single bit of volatile memory 540, commonly known as Random Access Memory ("RAM"), for short-term storage of data to be accessed by a processor 530, the processor altering data in the RAM and using data in the RAM to alter its own processes. This is commonly understood as one of the key interactions in modern computing. A 2D convolution ASIC 511 also communicates bi-directionally with both the system processor 530 and memory 540, in order to handle specialized processing of convolutional neural network 510 data much faster than a general central processing unit might otherwise achieve. A processor 530 also communicates with a neural network 510, which operates as a function $f$ in an algorithm 220, operating as a framework for machine learning algorithms 520 to process incoming data from a noise image 305 and goal image 304. After an input image 304 is re-created approximately, using the algorithm 220 in FIG. 2, the hyperparameters 302 of a neural network 510 are output to the network endpoint 301 for further use, including transmitting to a destination endpoint, saving on a hard-drive or external memory device, or other common uses for compressed images.

Figure 6:
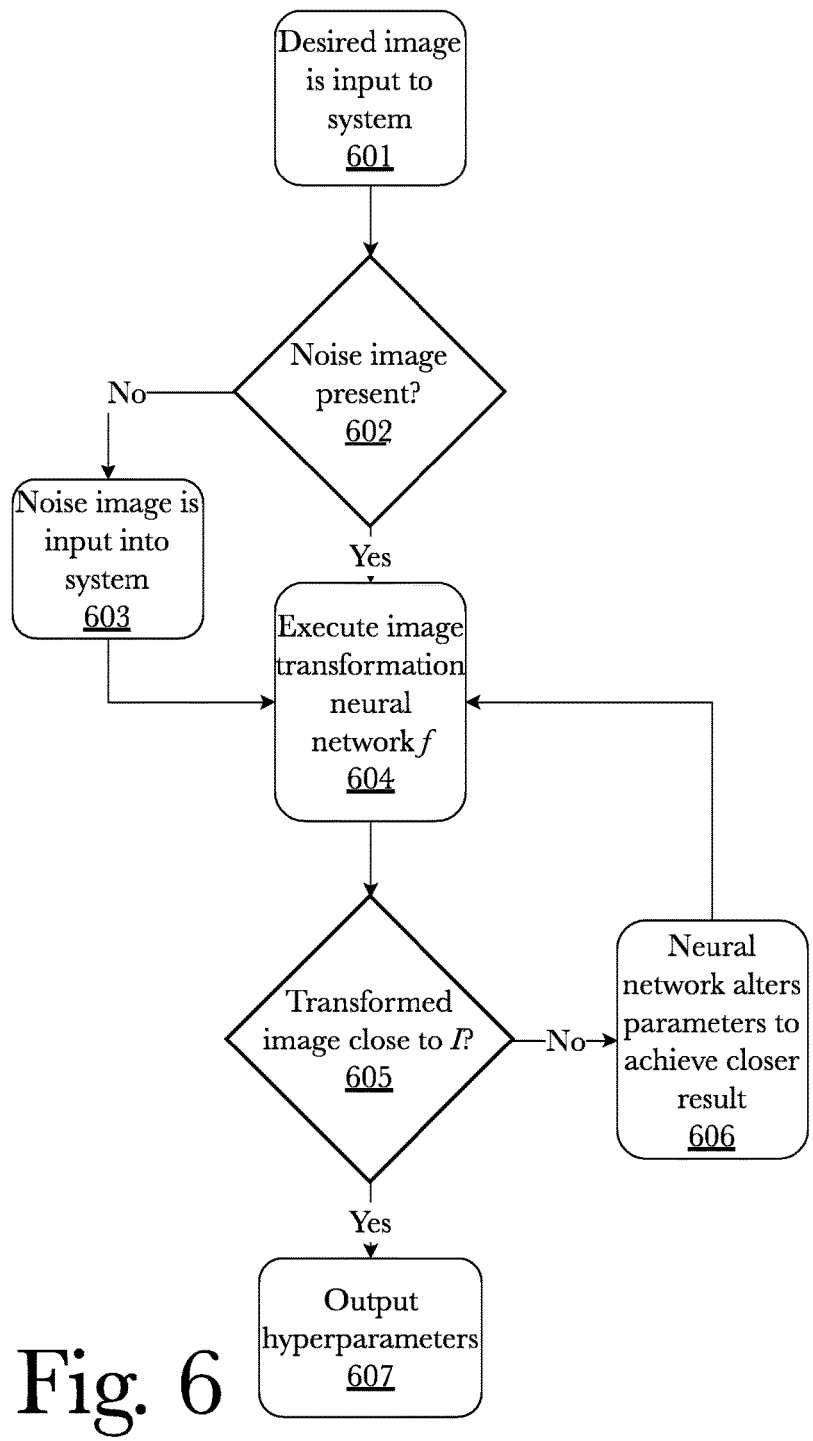
FIG. 6 is a flowchart illustrating the processing and compression of data through the system, according to an aspect.

FIG. 6 is a flowchart illustrating the processing and compression of data through the system, according to an aspect. A desired image I may be input into the system 601, this being the image that the system will attempt to transform a noise image into with specific hyperparameters. A check for a noise image is performed 602, which may yield either positive or negative results, regarding whether the system already possesses a static noise image 305. If there is no static noise image currently present in the system, a noise image may be input into the system 603, through a network endpoint 307 which may possess a static noise image, or it may be generated automatically, or come from some other source. If a static noise image is already present, or after it is received or input into the system 603, the system is at a state of both the static noise image N 305 and desired image I 304 being present in the system. It is at this point that an image transformation function $f$ may be utilized or executed 604 to apply to a static noise image N 305, the result of the transformation being checked for closeness to a desired image I 605. the closeness being defined by an error value, s, the hyperparameters of the neural network are output 607, and the system ends execution, ready to receive a new input image and begin execution again 601. If the image transformation function $f$ 410 operating on a noise image N 305 does not yield a sufficiently close result to desired image I 304, then a neural network 410 may alter the alterable hyperparameters $\theta$ 302 of a transformation neural network $f$ 410, 606 to attempt to produce ever-closer results, until the output is sufficiently close to an image I 304, 605.

Figure 7:
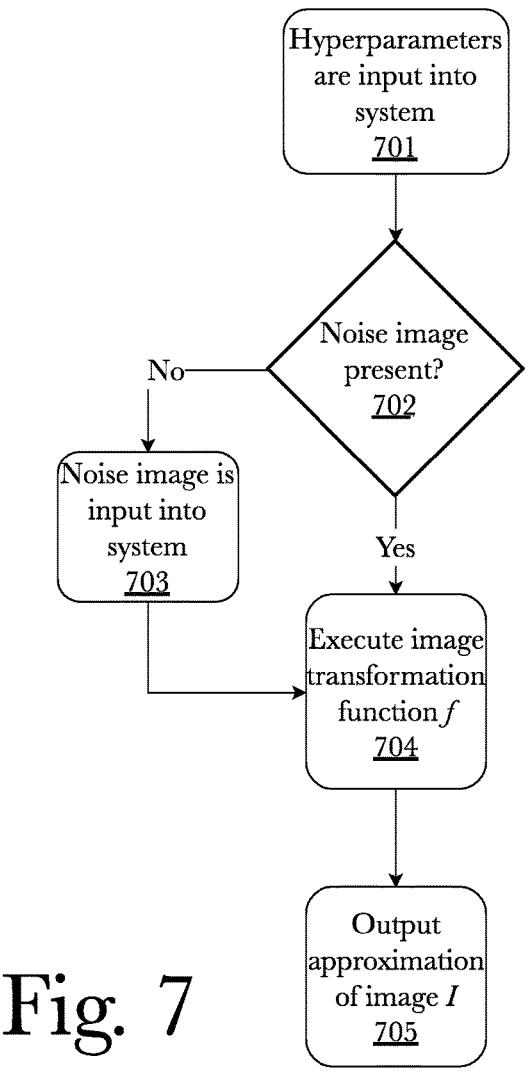
FIG. 7 is a flowchart illustrating the processing and de-compression of data through the system, according to an aspect.

FIG. 7 is a flowchart illustrating the processing and de-compression of data through the system, according to an aspect. First, hyperparameters are received and input into an image compression engine 701, which apply to the neural network 410 to determine the image transformation and convolution of a noise image into a desired image. The system is checked to ensure that a static noise image N is present 702, and if no noise image is present, such an image is input into the system 703, which may be sent from the same source as the alterable hyperparameters $\theta$, or may be inserted by a separate system, or manually input by a user on the system itself. After a noise image N is inserted into the system 703, or if the noise image is already present, for example if the noise image remains static and identical across all implementations of the disclosed invention, then an image transformation function $f$ may be executed 704, however instead of having no input hyperparameters as in FIG. 6, the hyperparameters are already input into the system 701, and the static noise image 305 is transformed 704 into an image I', which is an approximation of a desired image I 304, before being output 705. In this way, image compression is performed by specifying how to re-create an image rather than altering the image data itself, allowing the specifications for re-creating the image to be transmitted rather than the image itself, ensuring excellent compression of data.

Figure 8:
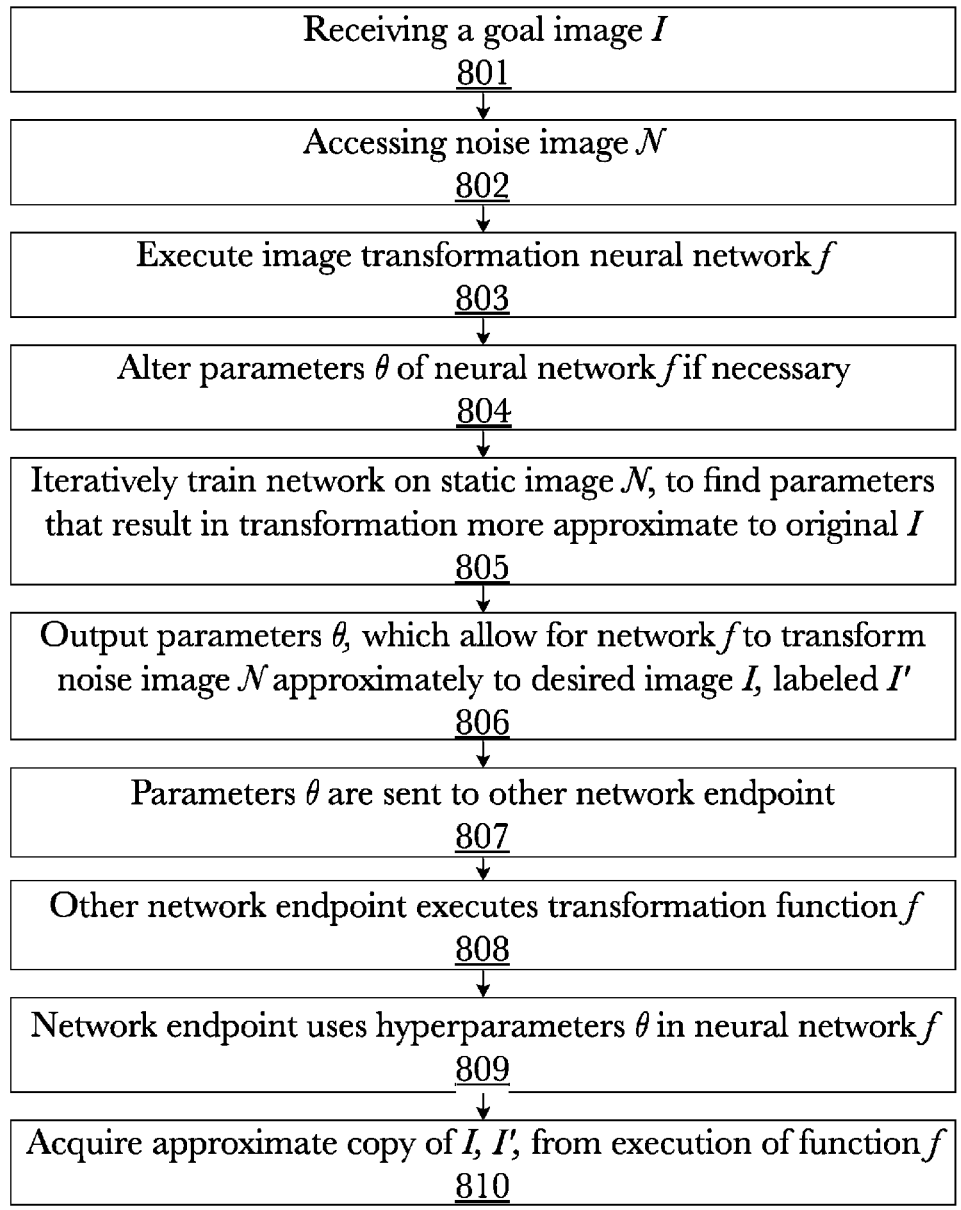
FIG. 8 is a method diagram of high-level components used in the operation of a system for lossy image compression utilizing non-generic neural networks, according to a preferred embodiment.

FIG. 8 is a method diagram of high-level components used in the operation of a system for lossy image compression utilizing neural networks, according to a preferred embodiment. First, a desired image must either be present, or input 801, this image being the image that will be attempted to be re-created with an image transformation network 410, before a static noise image N 305 is accessed 802. This noise image will be utilized by an image transformation function 410 to attempt to translate it, using alterable hyperparameters, into an approximation of an input desired image I 304. After an noise image is received or accessed if it is static and unchanging 304, the image transformation function $f$ 410 is executed 803, utilizing alterable hyperparameters θ 302 and feeding into a set of machine learning algorithms 250 operating on a neural network 260, resulting in alterable hyperparameters θ for image transformation function $f$ being altered 804, 805 in an attempt to translate a closer approximation to input image I 304. When an image is produced from a transformation of a noise image N 305, the alterable hyperparameters θ 302 are output 806, such that a user with the image transformation function 410, noise image 305, and hyperparameters 302, may re-create a close approximation of the original desired image 304. In this way, the image may be heavily compressed, and potentially encrypted from users without access to the image transformation function itself. Alterable hyperparameters θ 302 may then be sent to another network endpoint 307, 807, such as another laptop, desktop, or workstation device, or other device capable of running a 2D convolution ASIC as specified in FIG. 5. A destination network endpoint 307 may then, using alterable hyperparameters θ 302, execute an image transformation function $f$ 808, inputting alterable hyperparameters θ 809 as the parameters in which a neural network 410 transforms a noise image 305 to an approximate of a desired image I 304, 810.

Figure 9:
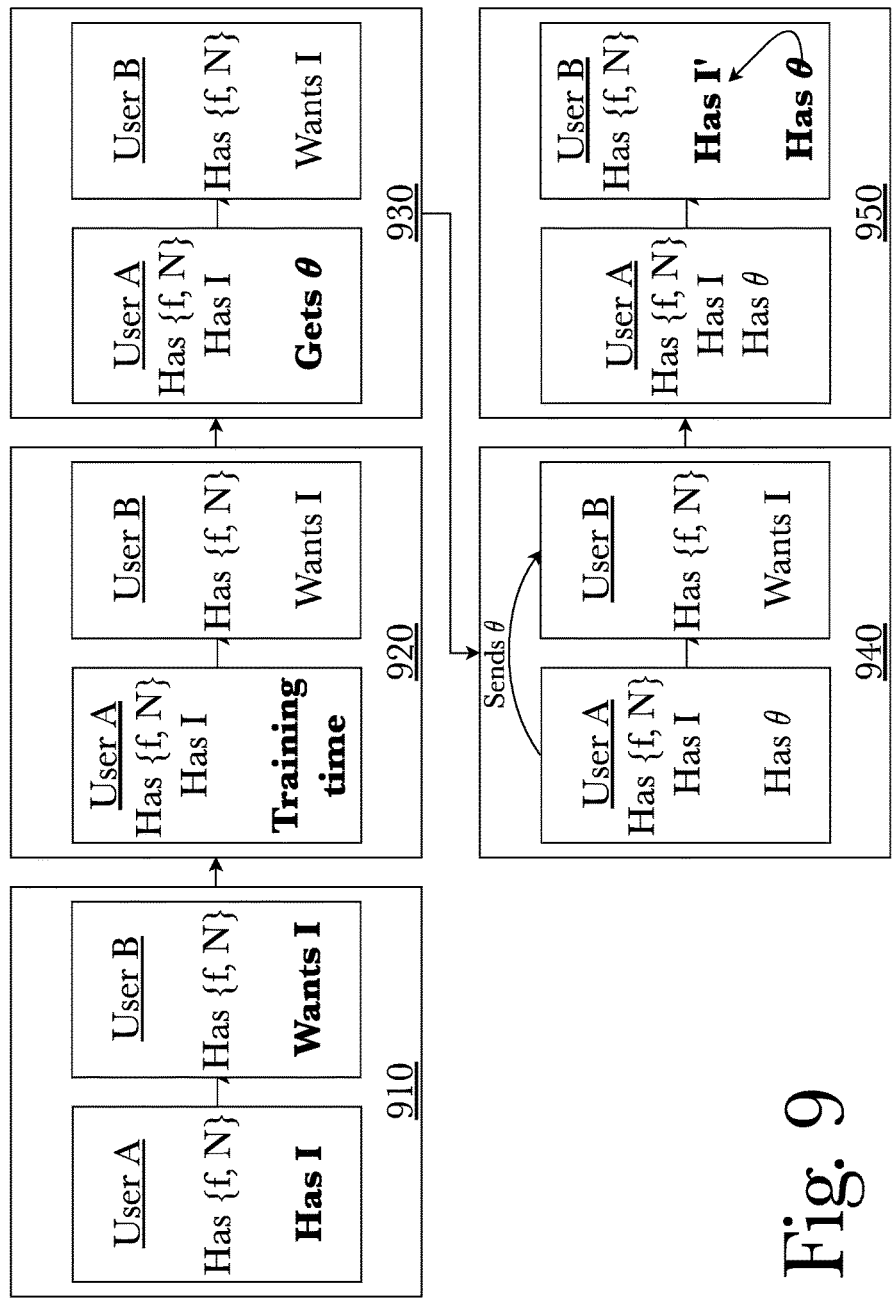
FIG. 9 is a state diagram of two users, one encoding and one decoding an image, using the disclosed compression system, according to a preferred aspect.

FIG. 9 is a state diagram of two users, one encoding and one decoding an image, using the disclosed compression system. In a first state 910, a user A has a desired image I 304, while a user B wants to receive an image I 304 and does not yet possess it. This is analogous to a user possessing an image to compress and send to another user, perhaps a friend, work colleague, or third-party service which requires for one of many possible reasons that the file be compressed first. In a second state 920, which necessarily follows from the first, training is undergone with a neural network 410 which allows for the hyperparameters θ 302 to be tuned to allow for an image transformation function to transform a static noise image N 305 into an approximation of a desired image I 304. A third state 930, proceeding from the second, allows for user A to acquire the parameters θ 302 as mentioned previously, from the training, before proceeding to a fourth state 940, in which hyperparameters θ 302 are sent from user A to user B, which allows for a fifth state to be reached 950, whereby user B, now possessing the hyperparameters θ 302, may acquire I 304 by utilizing an image transformation function $f$ 410 to transform a noise image N 305 into an approximation of a desired image I 304.

Figure 10:
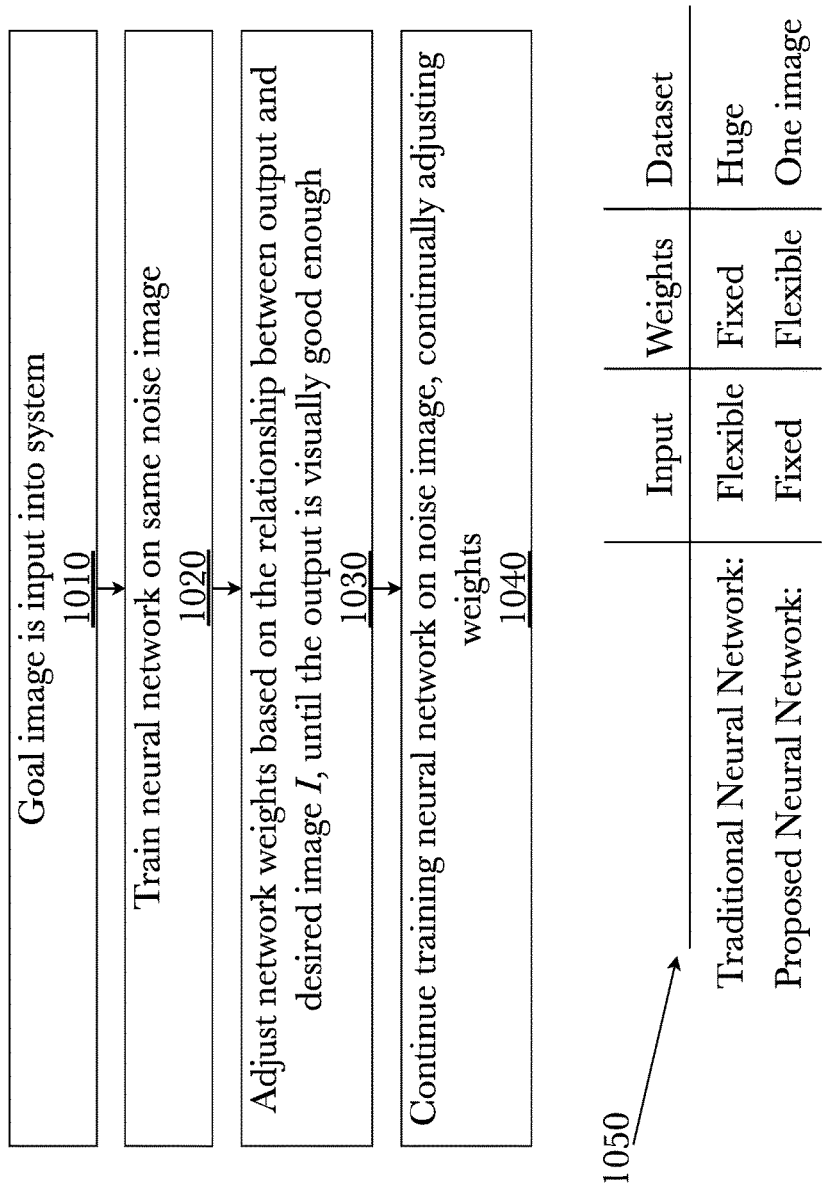
FIG. 10 is a method diagram illustrating training a neural network with a single image, as opposed to a plurality of images to learn from, resulting in a non-general approach to image compression, according to a preferred embodiment.

FIG. 10 is a method diagram illustrating training a neural network with a single image, as opposed to a plurality of images to learn from, resulting in a non-general approach to image compression. A desired image is input into the system 1010, as has been elaborated on previously in the disclosed system, such an image comprising any two-dimensional graphical file of one of the numerous viable formats including .BMP, .PNG, or others. A neural network 410 is trained 1020 using on a static noise image N 305, without changing or swapping out the image 305, resulting in a network trained on a single datapoint rather than a large dataset, unlike generalized neural networks. Rather than feeding a large dataset to a network, edge weights of a network are adjusted based on how close a given output of a network's image transformation has come to a desired image I 304, 1030. In this way, training is continued on a network 410 on a single noise image 305, using adjusted weights and parameters 1040. A table 1050 illustrates the differences, and relationship, between a traditional neural network which reaches generalized solutions to problems, and the proposed neural network 410, which utilizes a specialized method of training and does not learn general image transformation techniques, by training on a single noise image iteratively, altering the weights and parameters of the network as it generates new transformed images until a close approximation to the desired image is generated.

Figure 11:
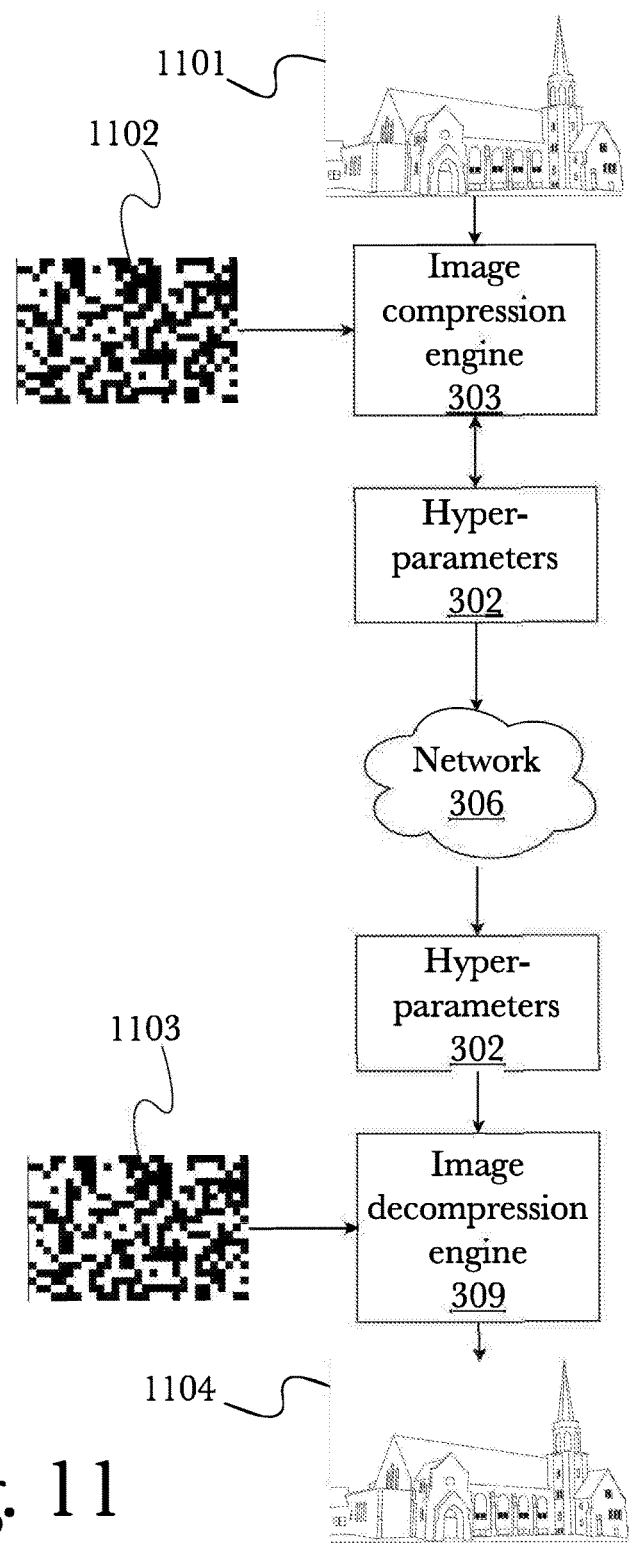
FIG. 11 is a diagram illustrating a line-drawn image, and a noise image, going into an image compression engine, parameters being identified which allow for a noise image to be approximately translated to an initial non-noise image, and relayed to a second system over a network to re-generate an approximation of the original image from a noise image.

FIG. 11 is a diagram illustrating an actual image, and a noise image, going into an image compression engine, parameters being identified which allow for a noise image to be approximately translated to an initial non-noise image, and relayed to a second system over a network to re-generate an approximation of the original image from a noise image. A sample image 1101, and a static noise image 1102, are input into an image compression engine 303. Hyperparameters 303 for re-creating image 1101 are devised through training a neural network to transform a noise image 1102 into a close approximation of a desired image 1101, the transformation being possible due to the noise image 1102 being a maximally entropic image capable of being transformed into any number of images with the correct transformation steps. Hyperparameters 302 for re-creating an image 1101 are sent over a network 306, where they are fed into an image decompression engine 309, along with a copy 1103 of the static noise image 1102, which outputs a close approximation 1104 of the desired image 1101. Note that this is not an identical copy, but a close approximation, therefore illustrating a lossy compression method, and creating a separate image file 1104, not identical to the original image 1101.

Figure 12:
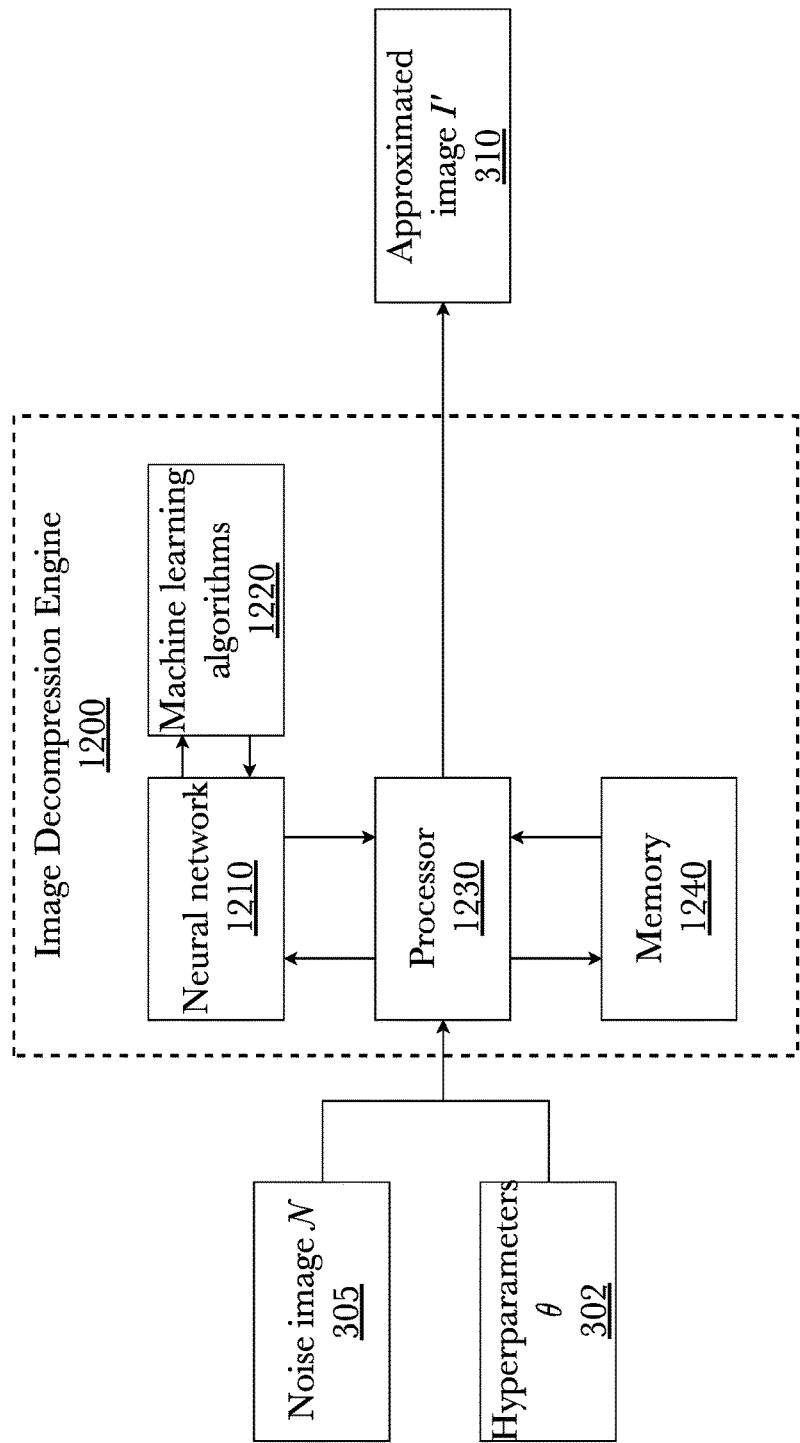
FIG. 12 is a system diagram of an image decompression engine used for de-compressing an image, according to an embodiment.

FIG. 12 is a system diagram of an image decompression engine 1200 used for de-compressing an image, according to an embodiment. It should be noted that the image decompression engine 1200 uses the same components as the image compression engine 303, but is configured to receive a noise image 305 and hyperparameters 302 via processor 1230, and to output an approximated image I'310. As shown in the right-hand portion of FIG. 3, a noise image N 305, and alterable hyperparameters 302 of a neural network 1210, are input into a processor 1230. A processor 1230 is a common computing device used to process arithmetic and logical operations, and is commonly known in the art. A processor 1230 has two-way communication with at least a single bit of volatile memory 1240, commonly known as Random Access Memory ("RAM"), for short-term storage of data to be accessed by a processor 1230, the processor altering data in the RAM and using data in the RAM to alter its own processes. This is commonly understood as one of the key interactions in modern computing. A processor 1230 also communicates with a neural network 1210, which operates as a function $f$ in an algorithm 220, operating as a framework for machine learning algorithms 1220 to process incoming data from a noise image 305 and, for the purposes of de-compression, the hyperparameters θ 302 of a previous neural network's compression of a goal image 304. After hyperparameters θ 302 are input into a processor 1230, the processor directs the neural network 1210 to incorporate and use these hyperparameters, directing the operation of the network as it transforms a noise image 305 into an approximation 310 of an input image 304, using the algorithm 220 in FIG. 2, the approximation image I'310 being output to the network endpoint 307 for further use, including transmitting to a destination endpoint, saving on a hard-drive or external memory device, or other common uses for now uncompressed images.

Figure 13:
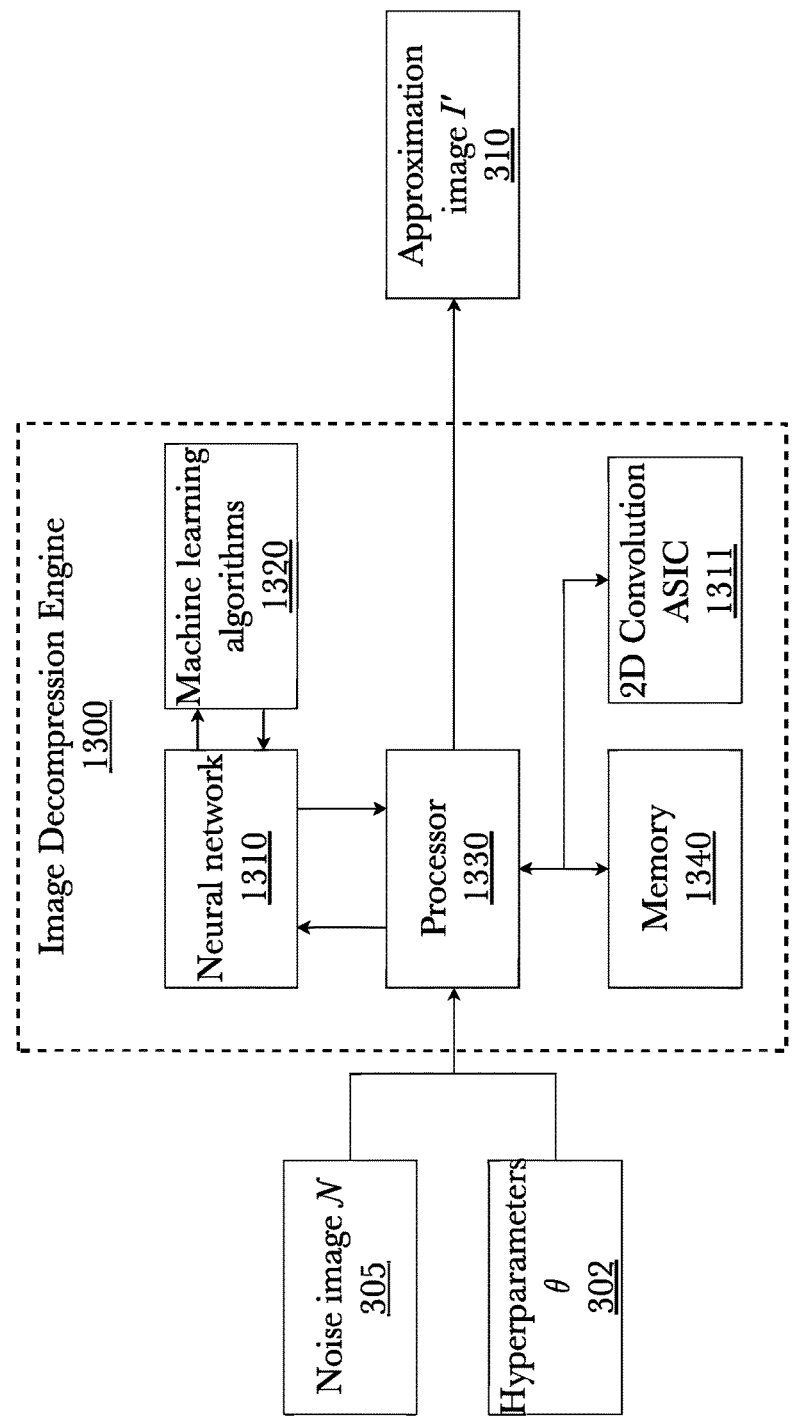
FIG. 13 is a system diagram of an image decompression engine utilizing a specialized 2D convolution Application Specific Integrated Circuit ("ASIC").

FIG. 13 is a system diagram of an alternative embodiment of an image decompression engine 1310 arrangement being used for decompression while utilizing a specialized 2D convolution Application Specific Integrated Circuit ("ASIC"), according to an embodiment. It should be noted that the image decompression engine 1300 uses the same components as the image compression engine 309, but is configured to receive a noise image 305 and hyperparameters 302, and to output an approximated image I'310. As shown in the right-hand portion of FIG. 3, a noise image N 305, and alterable hyperparameters 302 of a neural network 1310, are input into a processor 1330. A processor 1330 is a common computing device used to process arithmetic and logical operations, and is commonly known in the art. A processor 1330 has two-way communication with at least a single bit of volatile memory 1340, commonly known as Random Access Memory ("RAM"), for short-term storage of data to be accessed by a processor 1330, the processor altering data in the RAM and using data in the RAM to alter it's own processes. This is commonly understood as one of the key interactions in modern computing. A 2D convolution ASIC 1311 also communicates bi-directionally with both the system processor 1330 and memory 1340, in order to handle specialized processing of convolutional neural network 1310 data much faster than a general central processing unit might otherwise achieve. A processor 1330 also communicates with a neural network 1310, which operates as a function $f$ in an algorithm 220, operating as a framework for machine learning algorithms 1320 to process incoming data from a noise image 305 and, for the purposes of decompression, the hyperparameters θ 302 of a previous neural network's compression of a goal image 304. After hyperparameters θ 302 are input into a processor 1330, the processor directs the neural network 1310 to incorporate and use these hyperparameters, directing the operation of the network as it transforms a noise image 305 into an approximation 310 of an input image 304, using the algorithm 220 in FIG. 2, the approximation image I'310 being output to the network endpoint 307 for further use, including transmitting to a destination endpoint, saving on a hard-drive or external memory device, or other common uses for now uncompressed images.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 14:
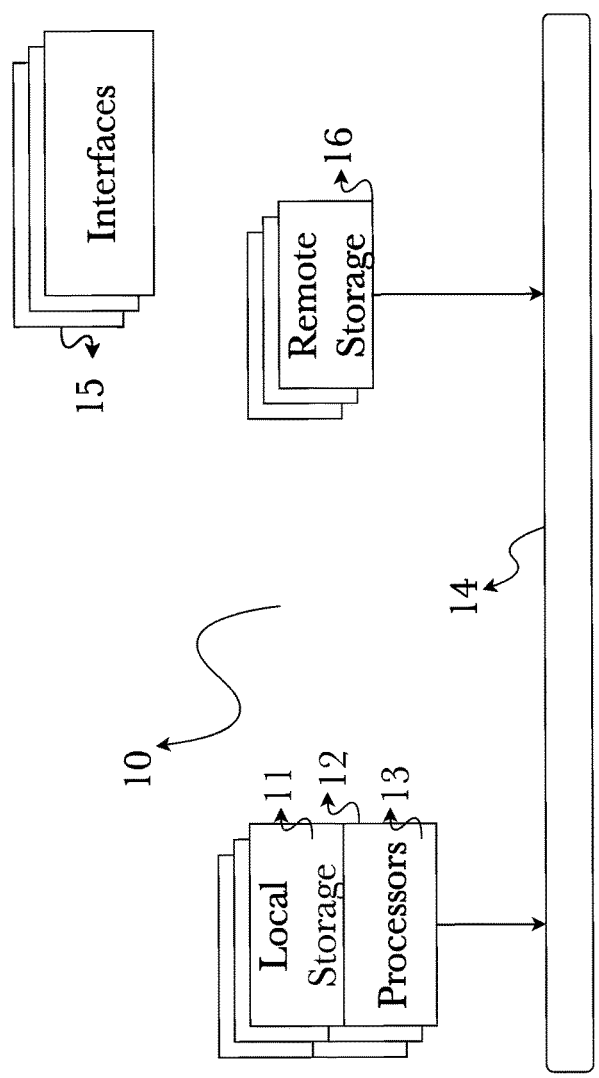
FIG. 14 is a block diagram illustrating an exemplary hardware architecture of a computing device.

Referring now to FIG. 14, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity AN hardware interfaces) and, in some instances, volatile and/or non-volatile memory (e.g., RAM).

Although the system shown in FIG. 14 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 15:
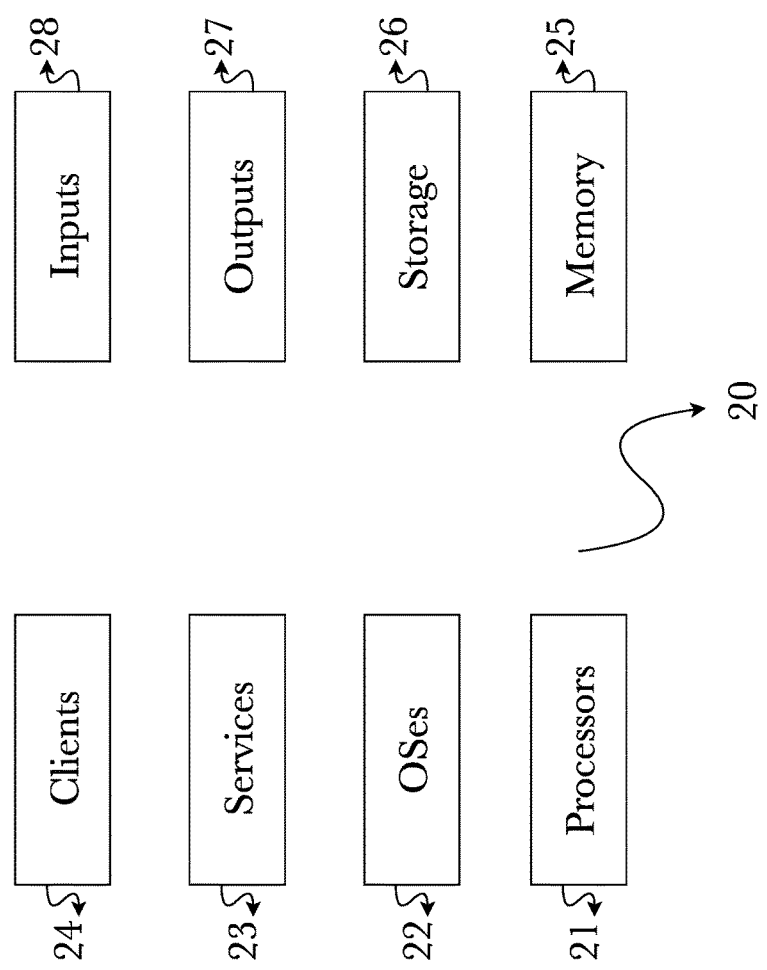
FIG. 15 is a block diagram illustrating an exemplary logical architecture for a client device.

In some embodiments, systems according to the present invention may be implemented on a standalone computing system. Referring now to FIG. 15, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 14). Examples of storage devices 26 include flash memory, magnetic hard drive, CD-ROM, and/or the like.

Figure 16:
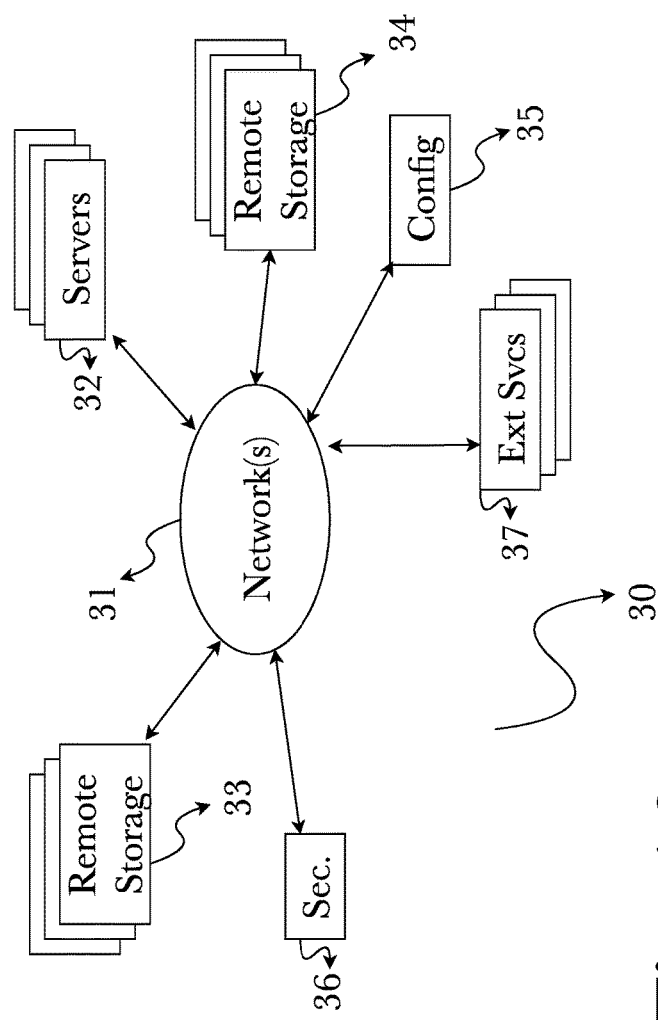
FIG. 16 is a block diagram showing an exemplary architectural arrangement of clients, servers, and external services.

In some embodiments, systems of the present invention may be implemented on a distributed computing network, such as one having any number of clients and/or servers. Referring now to FIG. 16, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 15. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any one of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 17:
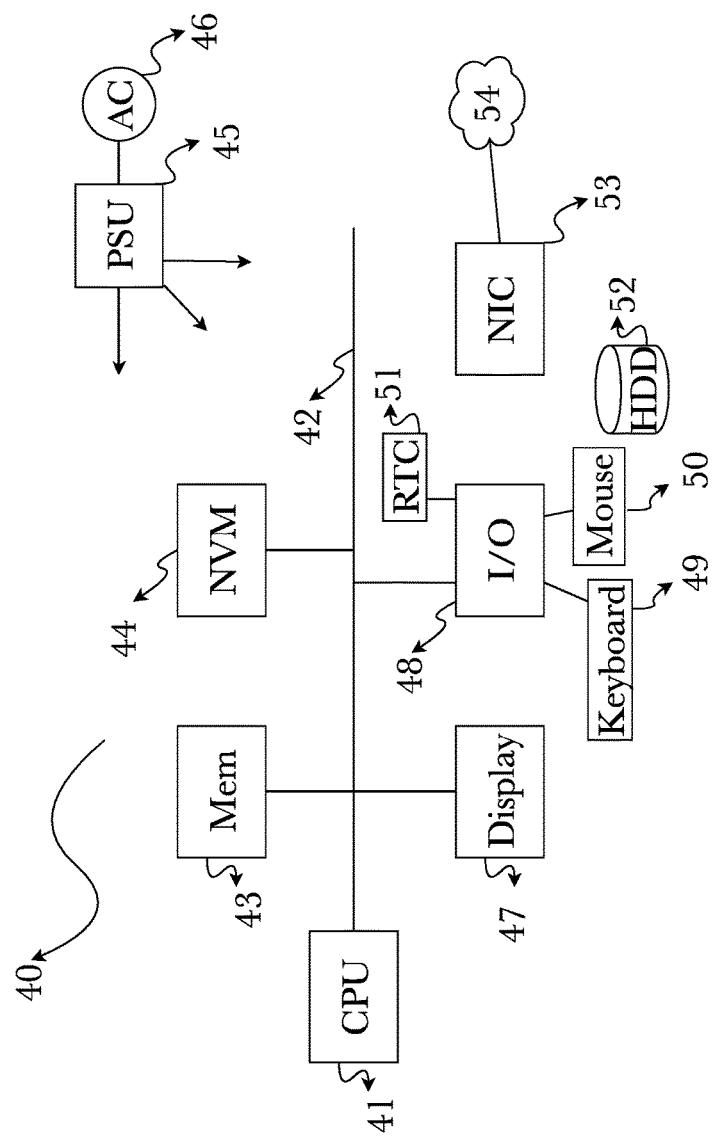
FIG. 17 is another block diagram illustrating an exemplary hardware architecture of a computing device.

FIG. 17 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for lossy image and video compression and transmission utilizing neural networks, comprising:
   an image compression engine comprising a first processor, a first memory, and a first plurality of programming instructions stored in the first memory, wherein the first plurality of programming instructions, when operating on the first processor, cause the first processor to:
   receive a desired image;

retrieve a noise image;

map the noise image to the desired image using a first neural network to find hyperparameters such that the hyperparameters, when applied to the noise image using the first neural network, produce an approximation of the desired image within an error that is less than a pre-determined threshold; and transmit the hyperparameters; and an image decompression engine comprising a second processor, a second memory, and a second plurality of programming instructions stored in the memory, wherein the second plurality of programming instructions, when operating on the second processor, cause the second processor to:

receive the hyperparameters;

retrieve the noise image; and apply the hyperparameters to the noise image using a second neural network to produce an approximation of the desired image within an error that is less than the pre-determined threshold.

2. The system of claim 1, wherein the image compression engine further comprises a dedicated 2D convolutional processor to accelerate the operation of the first neural network.

3. The system of claim 1, wherein the image decompression engine further comprises a dedicated 2D convolutional processor to accelerate the operation of the second neural network.

4. A method for lossy image and video compression and transmission utilizing neural networks, comprising the steps of:

receiving a desired image at a first computing device;

retrieving a noise image using the first computing device;

mapping, using the first computing device, the noise image to the desired image using a first neural network to find hyperparameters such that the hyperparameters, when applied to the noise image using the first neural network, produce an approximation of the desired image within an error that is less than a pre-determined threshold; and transmitting the hyperparameters to a second computing device; and receive the hyperparameters at a second computing device;

retrieving the noise image at the second computing device; and applying, using the second computing device, the hyperparameters to the noise image using a second neural network to produce an approximation of the desired image within an error that is less than the pre-determined threshold.

5. The method of claim 4, wherein the image compression engine further comprises a dedicated 2D convolutional processor to accelerate the operation of the first neural network.

6. The system of claim 4, wherein the image decompression engine further comprises a dedicated 2D convolutional processor to accelerate the operation of the second neural network.

\* \* \* \* \*